(No Model.) 3 Sheets—Sheet 3.

R. S. PEASE.
MANUFACTURE OF GLASS PLATES, CYLINDERS, &c.

No. 463,644. Patented Nov. 24, 1891.

Witnesses:
James F. Duhamel
Horace A. Dodge

Inventor
ROGER S. PEASE,
by Dodge & Sons,
Attys.

UNITED STATES PATENT OFFICE.

ROGER S. PEASE, OF ROSE, ASSIGNOR OF ONE-HALF TO COURTLANDT BABCOCK AND AMBROSE B. EVERTS, OF MINNEAPOLIS, MINNESOTA.

MANUFACTURE OF GLASS PLATES, CYLINDERS, &c.

SPECIFICATION forming part of Letters Patent No. 463,644, dated November 24, 1891.

Application filed February 24, 1891. Serial No. 382,565. (No model.)

*To all whom it may concern:*

Be it known that I, ROGER S. PEASE, a citizen of the United States, residing at Rose, in the county of Ramsey and State of Minnesota, having my place of business and post-office address at Minneapolis, Minnesota, have invented certain new and useful Improvements in the Manufacture of Glass Plates, Cylinders, &c., of which the following is a specification.

My invention relates to a method of and apparatus for the manufacture of glass plates, cylinders, pipes, and other bodies, as hereinafter more fully set forth.

Figure 1:
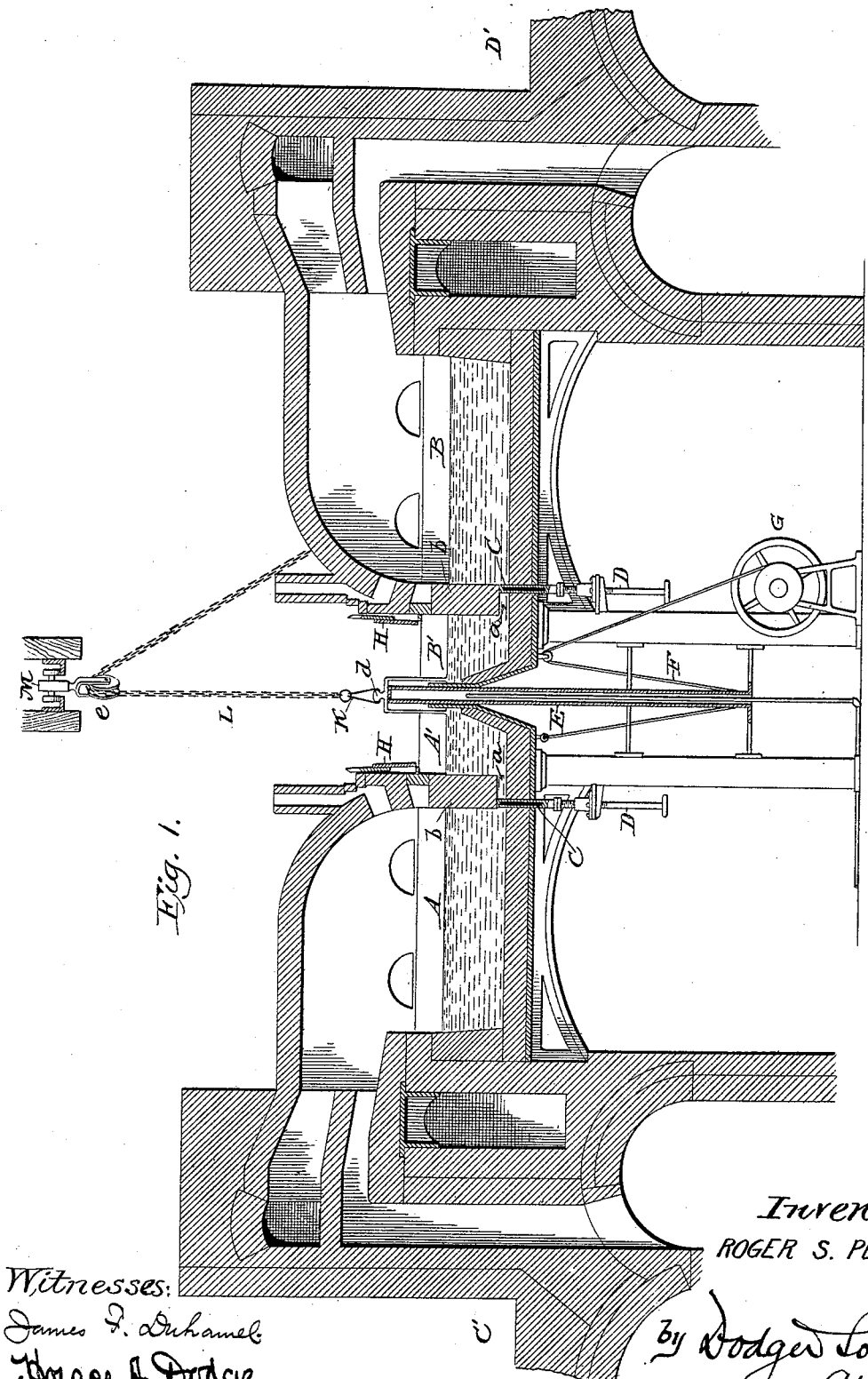
Figure 2:
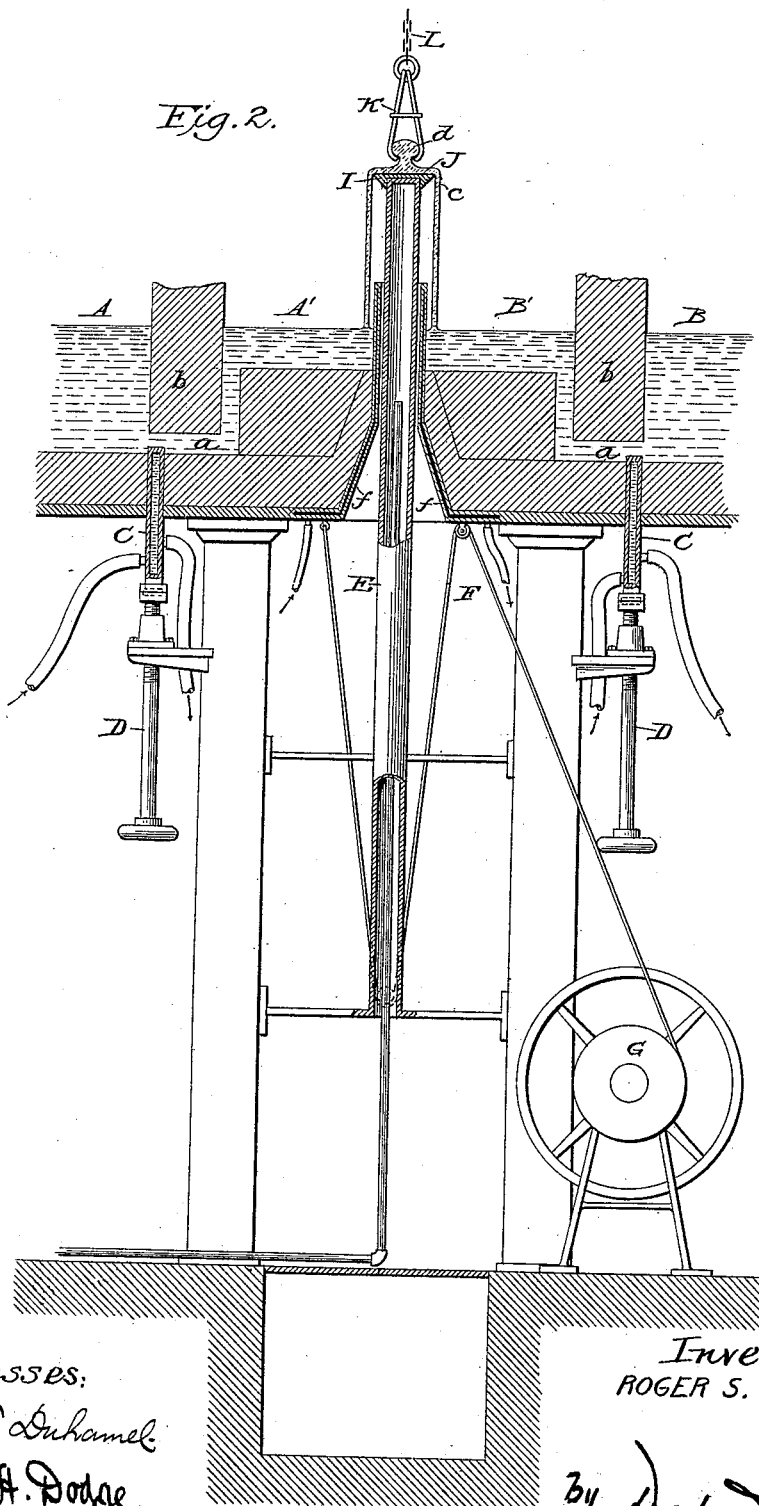
Figure 3:
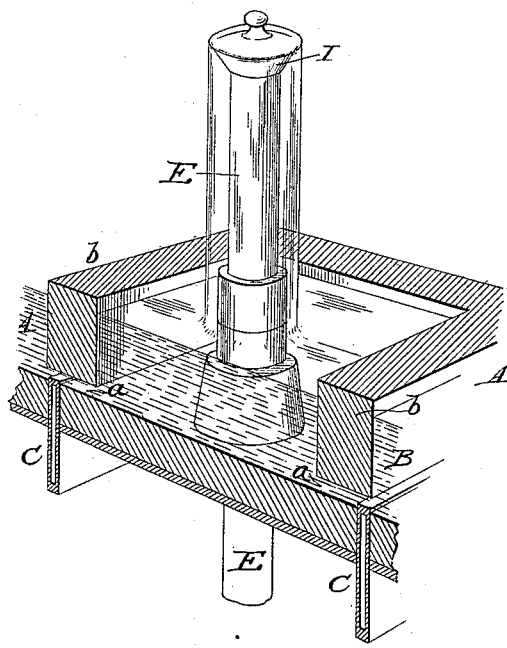
Figure 4:
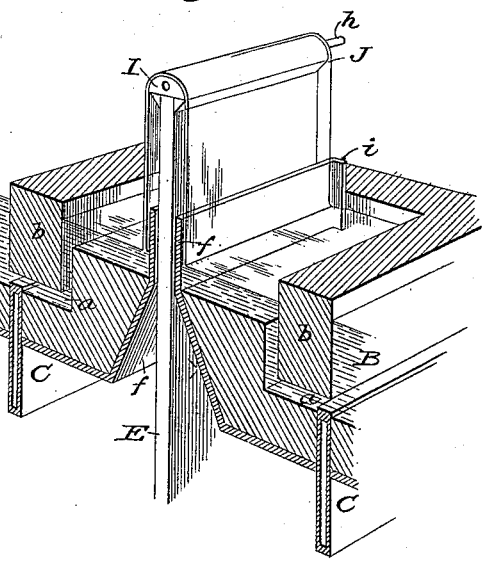
Figure 5:
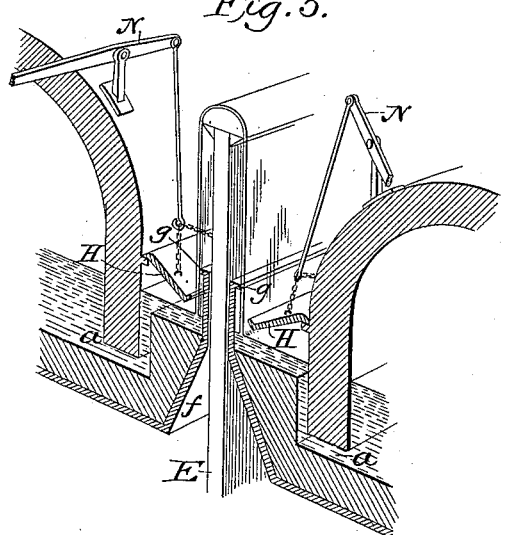

In the accompanying drawings, Figure 1 is a longitudinal vertical section through my apparatus, showing the tanks as arranged to be heated by regenerative furnaces of the well-known Siemens type, which arrangement is adopted in the drawings merely for purposes of illustration and not as indicating a necessary construction; Fig. 2, a sectional view of the portion to which the invention more particularly relates, drawn upon a somewhat larger scale; Fig. 3, a perspective view, partly in section, illustrating the action of the apparatus as applied to the formation of cylindrical bodies; Fig. 4, a similar view showing the arrangement as applied to the formation of a rectangular body; Fig. 5, a perspective view showing means for cooling the glass as it is drawn or formed into sheets, and Fig. 6 a perspective view of the bait employed in the formation of flat sheets or rectangular bodies.

The principal novelty in the present invention is that of forming sheets, hollow cylinders, or other hollow bodies by dropping or dipping into a mass of molten glass or metal the lower edge of a bait advisably of glass and causing the molten metal to adhere to the edge of the bait and to be drawn upward with the latter, the thickness of the edge of the bait, the consistency of the metal, and the rate of upward movement determining the thickness of the sheet, cylinder, or body produced. This thickness may be further determined and its uniformity maintained by the aid of cooling devices adapted to act upon the glass just above the level of the molten mass and to chill or cool the sheet or body drawn therefrom, and some device of this sort will be ordinarily required, particularly where the glass is to be of any considerable thickness.

For the manufacture of sheets and plates I may proceed in either of two ways—that is to say, I may either form first a hollow cylinder, and subsequently cut off the ends and split the cylinder in the direction of its axis, then flatten the sheet, as is done in the manufacture of window-glass at the present time; or I may produce two flat sheets, each attached at its upper end to the bait, and before the sheets are annealed sever them from the bait. The latter plan is preferred where it is desired to produce large or heavy sheets of thick glass, but for lighter glass the formation of a cylinder is preferred. The same method is applicable to the formation of hollow bodies of any desired cross-section, rectangular, cylindrical, or polygonal, the form of the bait being varied according to the desired formation of the body to be produced.

Referring now to the drawings, A and B represent two tanks designed to contain molten glass, which may be produced therein or delivered thereto from other melting-furnaces and merely kept at the proper consistency in said tanks. In practice, however, I prefer to reduce the batch in said tanks, and for that purpose provide the regenerative apparatus C and D, which, being well known and not constituting a part of the present invention, need not be further described herein.

The tanks A and B will be made of dimensions appropriate to the character of the work to be performed and to the desired capacity of the apparatus. In practice it is deemed desirable to construct the bottoms of the tanks of fire brick or clay sustained by a metal backing or bottom, the whole carried upon suitable columns and girders, so as to leave free space beneath the tanks for the passage of the workmen and for the mechanical appliances used in the operation of drawing or forming the sheets or bodies. The arching walls or tops of the furnaces extending over the tanks A and B are carried downward to the bottoms of the tanks and across the same from side to side, with the exception of suitable openings *a* at or near the bottoms of the tanks for the passage of the finer and heavier glass into extensions A' and B' of the tanks outside of the walls b.

The flow of glass from the tanks A and B to their outer extensions A' and B' is controlled by sliding gates C, which are advisably made of iron and formed with an internal space or opening, through which water or other cooling medium is caused to pass in order to protect the gates against the extreme heat to which they are subjected by being brought into contact with the molten glass. The gates are raised and lowered by means of screws D, provided with hand-wheels, or in any other convenient manner. When drawn down, the upper ends of the gates C are flush with the bottom of the tanks A B, and the metal flows freely and smoothly along the bottoms of the tanks beneath the walls b and upwardly into the tank-extensions A' and B', bringing the metal to a uniform level in the tanks and tank-extensions.

It is designed to work the apparatus continuously and to supply additional materials to the tanks or to the melting-furnaces which supply the tanks in proper quantity to maintain a substantially uniform level in the tanks A and B at all times.

The tank-extensions A' and B' may be entirely separate, or they may be connected, as indicated in Fig. 3, the latter construction being necessary for the formation of cylinders and other continuous bodies, while the separated or disconnected tank-extensions will be found preferable for the formation of sheets.

E indicates a vertically-movable plunger, which is advisably made hollow and cooled by means of a spray of water, a current of air, or other suitable cooling medium to prevent its being warped or injured by the heat to which it is subjected and enable it to cool or chill the glass which is raised about it, as will be further explained later on. This plunger may be raised and lowered in any convenient manner—as, for instance, by means of a cable F, passing from a fixed support on one side of the plunger and above its lower end downward to and about a pulley at the lower end of the plunger, thence upward and over another pulley located on the side of the plunger opposite the support to which the end of the cable is made fast, and finally to a winding-drum G. This arrangement gives adequate power and a steady movement to the plunger, which is also guided in any suitable manner to insure a perfectly uniform and regular movement. The plunger is designed to play through an opening in or between the tank-extensions A' and B', with sufficient space between the walls of the opening and its sides to form a free passage for air, and in order that the plunger may not be unduly heated the walls of the tank-extensions facing the plunger are inclined away from the plunger, as shown in Figs. 1, 2, 4, and 5.

The glass which flows into the tank-extensions A' and B' is subjected to the cooling influence of the atmosphere, and is thereby brought to the proper consistency for working; but to prevent undue or too rapid cooling of the glass thus exposed I may use guards or covers H, as shown in Fig. 1, which will be hinged at their lower edges to the walls b b and arranged to swing to the required position. These guards or covers may also be made to perform an additional function in cooling or severing the glass just as it begins to be drawn from the mass in the tank-extensions, so as to prevent its being drawn out too thin—a provision which will be further explained in connection with Fig. 5.

As shown in Figs. 1, 2, 3, 4, and 5, the walls of the tank-extensions nearest the plunger are made comparatively thin and are carried upward above the body or lining of fire-brick, and, if found necessary, may be made hollow and cooled by the passage of water, air, or other fluid through them.

The plunger E, in whatever form it may be made, and whether hollow or solid, as it may be in some cases, is spread out at the top, as best shown in Figs. 3 and 4, the enlargement being formed by means of a removable cap or top piece I of a form depending upon the character of the work to be done.

Referring now to Figs. 1, 2, and 3, which represent the apparatus arranged for the making of a hollow glass cylinder, the plunger E is represented as formed or provided with a circular cap I, which is designed to support a circular bait J, which is formed with a depending flange or lip c. This lip is designed to project downward far enough to permit it to enter a short distance from one to two inches (more or less) into the molten metal, when the plunger is lowered so as to bring the cap I down to the upper edge of the wall or casing of the tank-extension or receptacle containing the molten metal in the chamber into which the bait dips or the level to which the bait may be lowered relatively to the level of the molten metal. When the metal has been brought to the proper consistency and allowed to flow in and fill the tank-extension, the plunger E is raised to a sufficient height to permit the head or cap I to be placed thereon, after which the bait is placed over the cap, and then as promptly as may be the plunger is allowed to descend until the depending edge or flange of the bait dips into the molten metal a distance sufficient to cause a partial fusion of said edge and its union with the metal of the tank, so that upon reversing the motion of the plunger and lifting the bait the molten metal will be raised and caused to follow the bait. As above stated, the plunger is cooled by water or other cooling medium from within, and the air which passes upward around the plunger is cooled by contact with said plunger, and consequently chills the inner surface of the film or sheet drawn upward by or with the bait. Care should be taken to see that previous to causing the bait to descend to and enter the molten metal the latter be allowed to cool sufficiently to give it the proper consistency to insure the drawing out of the film to a proper thickness, as it will be readily understood that if the metal be in a too fluid condition the film or sheet will be very thin and may break in drawing; but the cooling action of the plunger within and of the atmosphere without insures a quite prompt cooling and hardening of the film or sheet, so that with reasonably careful management and proper speeding of the plunger in its rising movement the thickness of the film may be nicely determined and maintained.

As shown in Figs. 1, 2, and 3, the bait J, when used for cylindrical or polygonal bodies, is formed with a knob or boss $d$, which is designed to be clasped or engaged by a crab or clamping device K, which is suspended by a chain or cable L from a pulley $e$, swiveled in a truck or car M, which runs upon a suitable track at the top of the building or at a suitable elevation above the tanks. The purpose of this apparatus is to complete the drawing operation begun by the plunger, the latter being raised ordinarily only to such height as is necessary to begin the drawing operation and determine the thickness of the film or sheet to be produced, without which the plunger remains thus elevated and continues to act as a cooler for the interior of the glass body as the latter is drawn up by the chain or cable and clamping devices. When drawn out to the desired length, the cylinder, film, or sheet is cut or severed and allowed to rise freely without further drawing up metal from the tank or containing-receptacle, and the body thus drawn or formed is carried away by the truck M to the annealing-oven or to such other point as may be desired.

While I have described the drawing operation as being performed partly by the plunger and partly by other means, it is to be understood that it may be entirely performed by either of said means alone—that is to say, the plunger may rise to a height sufficient to fully complete the drawing or the bait may be lowered and again elevated to the required height by the chain or cable L without the aid of the plunger. I find, however, that the conjoint action of the two is better calculated to produce the results desired, and therefore prefer to make use of the two appliances.

It is important to be able to cool the molten metal to a greater or less degree, according to its consistency and other controlling circumstances or conditions, in order that the thickness of the film or sheet may be accurately gaged and varied from time to time, if desired. I therefore propose in some cases to make the metal facing or binding $f$ of the tank-extensions hollow and to provide the same with outwardly-turned lips or flanges $g$, Fig. 5, which project to such distance as will cause them to touch or nearly touch the film as the latter is drawn up from the molten metal, thus chilling or cooling the inner face of said film almost at the instant of its formation, giving to the same a solidity or consistency sufficient to insure the retention of its shape and thickness. Said result may be further insured by combining with said cooling-lips $g$ or by using independently thereof coolers H, which may be either solid plates or bodies of metal arranged to be drawn against or into close proximity with the film at a point near its commencement, or hollow metallic bodies cooled by water or other fluid passing through them and supplied from any convenient source. The coolers H may also be made to act as covers to retain the heat of the molten metal in the tank-extensions; but when used exclusively for that purpose it is preferred to hinge them to swing upward, as shown in Fig. 1, instead of swinging downward below the level of their hinges, as shown in Fig. 5.

By employing the cooling lips or flanges $g$ and the cooling-plates H and furnishing the latter with means for promptly raising and lowering them the plates H may also be made to serve the purpose of severing the sheet or film from the metal of the tank or hollow extension.

Referring to Fig. 5 it will be seen that as the coolers H are elevated their free or outer edges press the glass film against the cooling lips or edges $g$, and if the movement be made quick it will serve to effectually squeeze or press the glass between said edges and effect a severance thereof. Levers N or other suitable means may be provided for actuating the coolers H, suitable locking devices being provided to hold the levers, and consequently the coolers, at any desired adjustment. The same arrangement for this purpose is represented in Fig. 5; but obviously this may be considerably varied without departing from the spirit of my invention.

In Fig. 4 I have represented the plunger E as extending at its edges to the end walls of the tank-extensions A' and B', so that no metal is permitted to enter between the edges of the plunger and the walls of the tank. Hence it will be seen that if the plunger rise it will draw up two films or sheets, each disconnected from the other, except as they are joined at their upper ends by the bait J. Said figure always shows the cap or head I in a form suited for the formation of flat plates or sheets—that is to say, in the form of an elongated bar with a rounded or semicircular upper face and with ribs or flanges to fit down over the seats of the plunger and retain the head in position thereon. The ends of the cap or head are provided with lugs or gudgeons $h$ to receive the hooks or fastenings by which connection is made with the lifting chain or cable.

Figure 6:
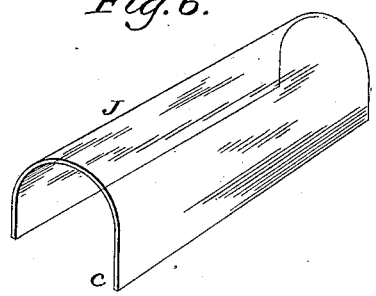

In Fig. 6 I have represented the bait in a form suitable for use in connection with the cap or bar and plunger shown in Figs. 4 and 5—that is to say, a bait curved to conform to the curvature of the upper surface of the cap or head I and with sides depending to a sufficient distance to insure the entrance of the edges into the molten metal when the plunger E is lowered to a proper level. This bait may be conveniently formed of a sheet of glass of proper size by simply placing the same over a block containing a recess of the desired contour of the bait and subjecting the plate to a sufficient degree of heat to cause it to sag and to rest upon the inner surface of the recess; but obviously the particular manner of shaping the bait is not important and may be varied at will.

It has been proposed heretofore to produce a sheet of glass by dipping an iron bar into the molten metal and then raising the bar; but so far as I am aware no one has ever practically succeeded in producing sheets of glass in this way on a commercial scale, although the idea was long since proposed and elaborately described. The difficulty I believe has been due to the fact that the rate of contraction and expansion of glass and iron differs widely, and that the glass is liable to be cracked or checked in consequence thereof before it can be detached from the bait or severed from the portion adhering thereto. By employing a glass bait these difficulties are completely obviated, it being well known to all familiar with glass-working that if a piece of glass be dipped into molten metal a fusion soon occurs which joins one to the other, and if the inserted glass be not too long subjected to the intense heat of the metal, or if it be promptly raised, it will be found that the molten metal will follow after it and will be drawn out to a uniform thickness.

It will be readily understood that the details of the apparatus may be considerably varied without departing in any manner from the essential features set forth herein. Thus other hoisting devices may be substituted for the chain or cable L and the pulley over which it passes or for the cable F, by which the plunger is raised and lowered, and levers may be substituted for the screws for raising and lowering the gates C. So, too, coal or oil burning furnaces may be substituted for the gas furnaces and regenerators illustrated, and in many other particulars the details may be varied.

By the employment of the gates C, working outside of the tanks proper and falling to a point where their upper ends or edges are just flush with the bottoms of the tanks, so that no part of the metal is caused to pass through an opening in the bottom of the tank, I avoid the rapid wearing away of the tank-body which always attends the flow of molten metal through an opening therein, the cooled plunger serving also to cool the firebrick, and thus to increase the protection of the opening. I thus avoid a serious obstacle which has been encountered in attempts to draw the metal off through a hole or opening in the bottom of the tank.

It is apparent that a single tank may be employed instead of the two tanks, or that a series of tanks may be used.

In order to prevent the film or sheet from adhering to the fire-brick walls at the edges, I provide the metal facings $f$ of the tank-extensions with outwardly-turned lips or guards $i$, Fig. 4, against which the edges of the glass are drawn. Being cooled, these lips or edges serve the triple purpose of cooling or partially chilling the edges, causing the metal to draw continuously of full width from guard to guard and preventing undue adhesion to or fusion with the walls of the receptacle containing the molten metal.

Having thus described my invention, what I claim is—

1. The herein-described method of forming sheets and films of glass, which consists in dipping the depending edge of a bait formed of glass into molten metal, permitting the edge to become partially or wholly fused by the molten metal, and then lifting the bait so as to draw up therewith the desired film or sheet.

2. The method of forming glass films or sheets, which consists in inserting the depending edge of a bait formed of glass into molten metal, permitting said edge to become partially or wholly fused with the molten metal, then lifting the bait, and thereby drawing upward with it a film of glass from the molten metal, at the same time subjecting said film to the action of suitable cooling devices or mediums.

3. In the manufacture of glass films and sheets, the following steps, viz: first, dipping the depending edge of a bait into molten metal; second, lifting the bait a distance sufficient to raise with it a film or sheet of the molten metal, at the same time raising within the body thus elevated a cooler, and subjecting said body to the cooling action thereof from within and to the cooling action of the atmosphere from without, so as to solidify the film, and, finally, lifting the bait and the body connected therewith subject to the internal and external cooling action, substantially as set forth.

4. The herein-described apparatus for the manufacture of glass films, sheets, and bodies, consisting of a tank having an extension, a plunger movable upward through the tank-extension, and a bait carried by said plunger and having a depending lip or flange to enter the tank-extension, substantially as set forth.

5. In an apparatus for the manufacture of glass films or sheets, a receptacle for containing molten glass, a plunger movable upward through said receptacle, but protected from the contact of the metal therein, and a bait carried by said plunger and having a depending flange or lip adapted to extend downward into the molten metal when the plunger is properly lowered.

6. In combination with a receptacle for containing molten metal, a plunger movable upward through said receptacle, a bait carried by said plunger, and a hoisting device above the bait and independent of the plunger, adapted to clasp and elevate the bait.

7. In combination with a receptacle adapted to contain molten metal, a plunger movable upward through the same, but protected against contact with its contents, a bait carried by said plunger, a hoisting device above and independent of the bait, but adapted to grasp the same, and a traveling car carrying said hoist and serving to convey the bait and the depending film or sheet to the annealing-oven or desired point.

8. In an apparatus for the manufacture of glass, the combination of a tank, as A, provided with an outlet, as $a$, at or near its bottom, and a vertically-movable gate, as C, adapted to move across said outlet from below, substantially as and for the purpose set forth.

9. In combination with tank A and wall $b$, outlet $a$ at or near the bottom of the tank, gate C, movable across said outlet from below, and a screw-stem D, connected with and serving to move said gate.

10. In an apparatus for the manufacture of glass films or sheets, the combination of a suitable receptacle for containing molten metal, a plunger movable vertically through said receptacle, and a cooling-lip $g$, surrounding said plunger and serving to cool the film carried upward thereby.

11. In combination with a receptacle for containing molten metal and with a plunger movable vertically through the same, a cooler, as H, adapted to act upon the outer surface of the film raised by the plunger and to cool the same, substantially as and for the purpose set forth.

12. In combination with a receptacle for containing molten metal and with plunger S movable upward through the same, cooling-lip $g$, and cooler H, adapted, respectively, to cool the inner and the outer surfaces of the film carried upward by the plunger.

13. In an apparatus for the manufacture of glass films and sheets, the combination of a vessel adapted to contain molten metal, a plunger movable upward through the same, but protected against contact with the molten metal, and a detachable cap or head applied to said plunger, substantially as shown and described.

14. In combination with a receptacle adapted to contain molten metal, a plunger movable upward through the same, a cap or head applied to said plunger and overhanging the sides thereof, and a bait carried by said cap and having a depending flange or skirt to enter the molten metal.

15. In combination with a vessel adapted to contain molten metal, a bait formed of glass provided with a depending flange, and means, substantially as described, for lowering the bait until its flange enters the molten metal and subsequently elevating the same.

In witness whereof I hereunto set my hand in the presence of two witnesses.

ROGER S. PEASE.

Witnesses:
WALTER S. DODGE,
WILLIAM W. DODGE.